United States Patent
Oh et al.

(10) Patent No.: US 8,303,918 B2
(45) Date of Patent: Nov. 6, 2012

(54) METHOD FOR PREPARING CERIUM CARBONATE POWDER USING UREA

(75) Inventors: Myoung-Hwan Oh, Daejeon (KR); Seung-Beom Cho, Daejeon (KR); Jun-Seok Nho, Daejeon (KR); Jong-Pil Kim, Daejeon (KR); Jang-Yul Kim, Daejeon (KR); Dong-Mok Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 302 days.

(21) Appl. No.: 12/531,452

(22) PCT Filed: Mar. 14, 2008

(86) PCT No.: PCT/KR2008/001452
§ 371 (c)(1),
(2), (4) Date: Jan. 19, 2010

(87) PCT Pub. No.: WO2008/114965
PCT Pub. Date: Sep. 25, 2008

(65) Prior Publication Data
US 2010/0148113 A1  Jun. 17, 2010

(30) Foreign Application Priority Data
Mar. 16, 2007  (KR) ........................ 10-2007-0025884

(51) Int. Cl.
*C01F 17/00* (2006.01)
*C09K 3/14* (2006.01)
(52) U.S. Cl. ........................................ 423/21.1; 51/309
(58) Field of Classification Search ................... 423/21.1
See application file for complete search history.

(56) References Cited

U.S. PATENT DOCUMENTS
2006/0162260 A1  7/2006  Nho et al.
2007/0079559 A1*  4/2007  Oh et al. ........................ 51/309

FOREIGN PATENT DOCUMENTS
| JP | 07-144915 A | 6/1995 |
| JP | 07-172826 A | 7/1995 |
| JP | 2000-159521 A | 6/2000 |
| JP | 2000159521 A * | 6/2000 |
| JP | 2002-348563 A | 12/2002 |
| KR | 10-0417529 B1 | 1/2004 |
| KR | 10-0786961 B1 | 12/2007 |
| KR | 10-0815051 B1 | 3/2008 |

OTHER PUBLICATIONS

Machine translation of JP 2000-159521, Sakai et al.*
English translation of Office Action issued in Chinese Patent Appl.n. No. 200880008481.3, issued on Nov. 16, 2010, 5 pages.
English abstract of KR 1020010074199 A, published Aug. 4, 2001, which corresponds to KR 10-0417529.
English abstract of KR 1020060134384 A, published Dec. 28, 2006, which corresponds to KR 10-0815051.
English abstract of KR 1020070032907 A, published Mar. 23, 2007, which corresponds to KR 10-0786961.

* cited by examiner

*Primary Examiner* — Roy King
*Assistant Examiner* — Jared Wood
(74) *Attorney, Agent, or Firm* — Rothwell, Figg, Ernst & Manbeck, P.C.

(57) ABSTRACT

In a method for preparing cerium carbonate powder by mixing a cerium precursor solution with a urea solution and carrying out a precipitation reaction, wherein the cerium carbonate powder has a hexagonal crystal structure, by using at least one type of organic solvent as a solvent for either or both the cerium precursor solution and the urea solution, and adjusting temperature of the precipitation reaction within a range of 120° C. to 300° C. Also, the method can yield cerium carbonate powder, cerium oxide powder from the cerium carbonate powder, and CMP slurry including the cerium oxide powder as an abrasive. In the method, urea as a precipitant can improve the uniformity of a reaction, and thus it is possible to easily and inexpensively obtain cerium carbonate powder with a hexagonal crystal structure without the danger by high-temperature high-pressure and the need for an expensive system in hydrothermal synthesis.

6 Claims, 1 Drawing Sheet

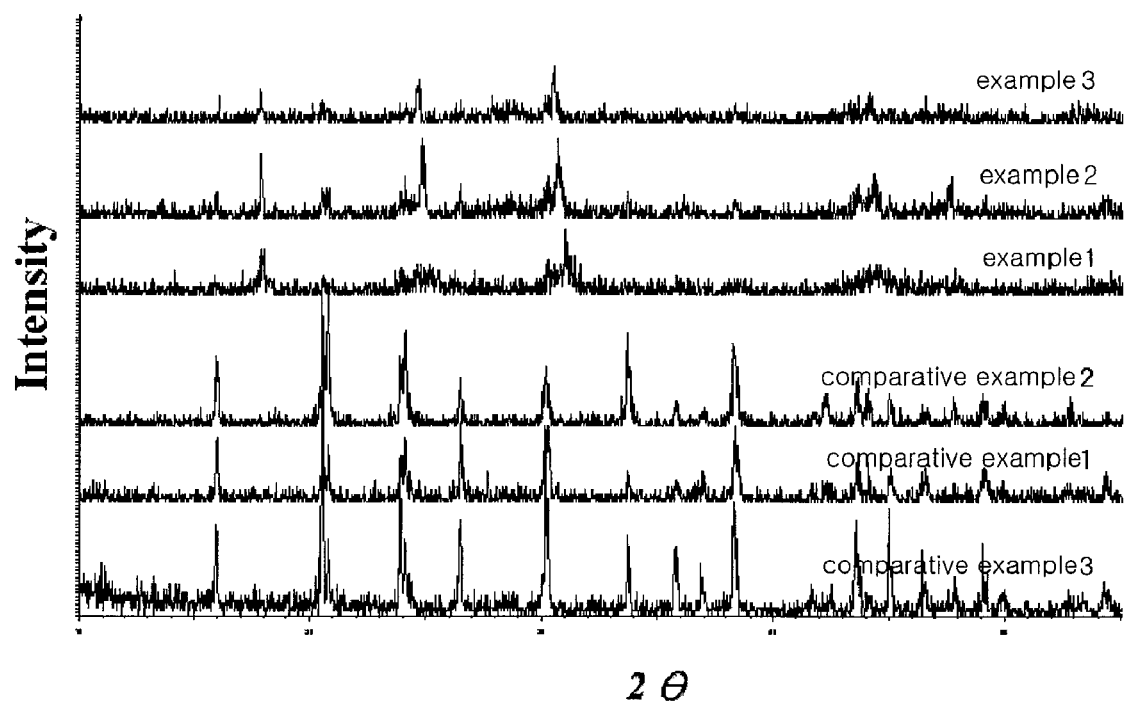

METHOD FOR PREPARING CERIUM CARBONATE POWDER USING UREA

CROSS REFERENCE TO RELATED APPLICATIONS

This application is a 35 U.S.C. §371 National Phase Entry Application from PCT/KR2008/001452, filed Mar. 14, 2008, and designating the United States, which claims priority under 35 U.S.C. §119 to Korean Patent Application No. 10-2007-0025884 filed Mar. 16, 2007, which is incorporated herein in its entirety.

TECHNICAL FIELD

The present invention relates to a method for preparing cerium carbonate powder under atmospheric pressure by a precipitation method using urea, in which cerium carbonate powder with a hexagonal crystal structure can be obtained by controlling the temperature of a precipitation reaction.

BACKGROUND ART

As generally known in the art, cerium oxide ($CeO_2$) is a highly functional ceramic material that is widely used in catalysts, phosphors, cosmetics and polishing agents, and has recently been spotlighted as an abrasive for use in an STI (Shallow Trench Isolation) process of a semiconductor device, and as an optical glass polishing agent. Such cerium oxide is generally prepared by a liquid-phase process, in which cerium oxide powder is formed directly from a trivalent or tetravalent cerium precursor by adding a precipitant thereto, a solid-phase process, in which cerium oxide powder is formed by providing an intermediate product, such as cerium carbonate, and then performing a firing step, and the like.

Particularly, in the solid-phase process, cerium carbonate is widely used as an intermediate product of cerium oxide, and research on the types and shapes of cerium carbonate is being actively pursued because they have a great effect on the physical properties and shapes of cerium oxide.

Several examples of conventional technology for synthesizing cerium carbonate powder in a solution phase include 1) a method of preparing orthorhombic cerium carbonate powder by subjecting a cerium salt and urea to a precipitation reaction, 2) a method of preparing hexagonal cerium carbonate powder by subjecting a cerium salt and urea to a hydrothermal reaction, and 3) an attempt to adjust powder crystallinity depending on the type of a salt, reaction temperature, reaction time, and concentration of urea when cerium carbonate powder is prepared by subjecting cerium chloride, cerium sulfide, or cerium nitrate anhydrate and urea to a hydrothermal reaction, and so forth. However, no study has been conducted on adjusting powder crystallinity at relatively low precipitation temperature under atmospheric pressure.

The crystal structure of cerium carbonate varies according to preparation methods, and particularly may be divided into an orthorhombic structure, a hexagonal structure, and the like. As far as is known, the orthorhombic cerium carbonate can be prepared by an aqueous solution-based precipitation reaction, and the hexagonal cerium carbonate can be prepared by high-temperature high-pressure hydrothermal synthesis. However, as processes are scaled up, high pressure employed in the hydrothermal synthesis becomes more dangerous, which results in high equipment cost.

Also, the use of urea as a precipitant has several advantages such as a very stable reaction, the improvement in uniformity of a powder property due to uniform precipitation formation, etc. However, in preparation of cerium carbonate under atmospheric pressure by an aqueous solution-based precipitation reaction, when urea is used as a precipitant, it may be difficult to control the crystal structure of cerium carbonate.

DISCLOSURE OF THE INVENTION

Therefore, the present invention has been made in view of the above-mentioned problems. The present inventors have discovered that in preparing cerium carbonate under atmospheric pressure by a precipitation reaction using urea as a precipitant, it is possible to obtain cerium carbonate powder with a hexagonal crystal structure other than a conventional orthorhombic crystal structure, by increasing the precipitation reaction temperature up to 120° C. or more. Accordingly, when at least one type of organic solvent is included in a reacted solution, the precipitation reaction temperature may vary according to various boiling points of the organic solvent, and thus the crystal structure of resultant cerium carbonate powder can be easily controlled.

In accordance with an aspect of the present invention, there is provided a method for preparing cerium carbonate powder by mixing a cerium precursor solution with a urea solution and carrying out a precipitation reaction, wherein the cerium carbonate powder has a hexagonal crystal structure, by using at least one type of organic solvent as a solvent for either or both the cerium precursor solution and the urea solution, and adjusting temperature of the precipitation reaction within a range of 120° C. to 300° C.

In accordance with another aspect of the present invention, there is provided cerium carbonate powder prepared by the above described method.

In accordance with yet another aspect of the present invention, there is provided cerium oxide powder, which is prepared by heat-treating the cerium carbonate powder at 300° C. to 1500° C.

In accordance with a further aspect of the present invention, there is provided CMP slurry including the cerium oxide powder as an abrasive.

Hereinafter, the present invention will be described in more detail.

A production reaction of cerium carbonate by a precipitation reaction of a cerium precursor and a carbonate precursor is explained as follows. Reaction Scheme 1 and the Reaction Scheme 2 indicate a production reaction of orthorhombic cerium carbonate, and a production reaction of hexagonal cerium carbonate, respectively.

$$2[Ce_2(H_2O)_n]^{3+} + 3CO_3^{2-} \rightarrow Ce_2O(CO_3)_2 \cdot H_2O + CO_2 + (n-1)H_2O \qquad \text{[Reaction Scheme 1]}$$

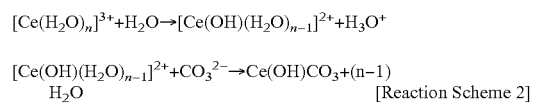
$$[Ce(H_2O)_n]^{3+} + H_2O \rightarrow [Ce(OH)(H_2O)_{n-1}]^{2+} + H_3O^+$$

$$[Ce(OH)(H_2O)_{n-1}]^{2+} + CO_3^{2-} \rightarrow Ce(OH)CO_3 + (n-1)H_2O \qquad \text{[Reaction Scheme 2]}$$

It is known that orthorhombic cerium carbonate is easily prepared by a conventional aqueous solution-based precipitation reaction, but hexagonal cerium carbonate has been difficult to prepare by an aqueous solution.

For example, in production of hexagonal cerium carbonate by Reaction Scheme 2, before $CO_3^{2-}$ is bound to a Ce ion, weak hydrolysis of the Ce ion is required. Such a reaction may be carried out at a high reaction temperature. Accordingly, an aqueous solution-based precipitation reaction could not use reaction temperature higher than 100° C. due to limitation in a boiling point of water, and thus in order to increase the reaction temperature, high-temperature high-pressure hydrothermal synthesis has been required. However, as processes are scaled up, high pressure employed in the hydrothermal synthesis becomes more dangerous, which results in high equipment cost. The present invention provides a method of controlling the crystal structure of cerium carbonate powder under atmospheric pressure by a precipitation reaction without using hydrothermal synthesis.

In the present invention, when cerium carbonate powder is prepared under atmospheric pressure by a precipitation reaction from a cerium precursor and urea, at least one type of organic solvent is used, while in a conventional method, only water is used as a solvent. Herein, it is possible to prepare cerium carbonate powder with a hexagonal crystal structure through control of the crystal structure of the resultant cerium carbonate by varying temperature of the precipitation reaction.

In a reaction where urea is used as a precipitant, there are several advantages, such as a stable reaction, uniform powder formation as described above, but even though several reaction conditions are changed, cerium carbonate with only an orthorhombic crystal structure has been conventionally obtained. However, in the present invention, since a solvent including at least one type of organic solvent is used, it is possible to increase reaction temperature up to 100° C. or more, even under atmospheric pressure, and thus even though urea is used as a precipitant, cerium carbonate with a hexagonal crystal structure can be easily obtained.

Especially, when precipitation reaction temperature is adjusted in a range of 120° C. to 300° C., it is possible to easily obtain cerium carbonate powder with a hexagonal crystal structure. Herein, in order to adjust the precipitation reaction temperature to 120° C. or more, a boiling point of an organic solvent included as a solvent is required to be 120° C. or more.

Therefore, the precipitation reaction temperature is preferably lower than a boiling point of an organic solvent included as a solvent. If the reaction temperature is higher than the boiling point of the solvent, a uniform reaction cannot be achieved due to evaporation of the solvent.

The boiling point of an organic solvent used in the present invention preferably ranges from 120° C. to 300° C. When the boiling point of the organic solvent is within the above described range, the solvent can be easily treated due to appropriate volatility, results in high yield after a reaction, and can be easily washed off.

Specifically, non-limiting examples of the organic solvent that may be used in the present invention include:

1) alcohol based: hexanol, heptanol, octanol, etc with a carbon number of 6 or more.

2) glycol based: ethylene glycol, propylene glycol, butylene glycol, etc.

3) others: dimethyl sulfoxide, dimethyl formamide, etc.

The organic solvent may include one or at least two kinds of solvents selected from the examples. Also, a cerium precursor solution and a urea solution may use the same or different organic solvents.

The cerium precursor is not particularly limited as long as it is a cerium containing compound, but preferably has a salt form. Non-limiting examples of such a cerium precursor include cerium nitrate, cerium acetate, etc.

In the present invention, urea ($NH_2CONH_2$) is used as a carbonate precursor, which provides a carbonate ion ($CO_3^{2-}$), and plays a role of controlling pH.

In preparing precursor solutions by dissolving the cerium precursor and the urea in solvents, respectively, the solvents preferably include at least one type of organic solvent. In other words, a cerium precursor solution and a urea solution may use water, an organic solvent, or a mixture thereof as a solvent, respectively, and at least one of the cerium precursor solution and the urea solution must include an organic solvent. Therefore, except the case where both the cerium precursor solution and the urea solution use water as solvents, all cases may be included within the present invention.

Herein, in consideration of the solubility of the cerium precursor and the urea in an organic solvent, it is preferable that the cerium precursor and a solvent are mixed at a weight ratio of 1:100~1:1, and the urea and a solvent are mixed at a weight ratio of 1:100~1:1.

When the concentration of the cerium precursor and the urea is decreased, the solubility in a solution is increased, which results in a uniform and mild precipitation reaction, and thus it is possible to prepare powder having a uniform particle size. However, if the concentration is lower than the above concentration range, the yield of the powder may decrease, thereby decreasing the applicability to an actual process. Contrarily, if the concentration is higher than the above concentration range, some problems may be caused in the reaction, such as delay in dissolution time, violent reaction, and boiling, etc.

Cerium carbonate powder may be precipitated through a precipitation reaction by mixing the cerium precursor solution and the urea solution as described above.

Herein, it is preferable that the cerium precursor solution and the carbonate precursor(urea) solution are mixed in such a manner that a mixing ratio of the cerium precursor to the carbonate precursor(urea) is 1M: 0.1M~20M in the mixed solution. If the concentration of the carbonate precursor(urea) is lower than the above described range, the yield of finally obtained cerium carbonate powder may decrease, and contrarily, if the concentration of the carbonate precursor(urea) is higher than the above described range, boiling may occur during a reaction of the two solutions, thereby causing difficulty in the reaction.

Also, the increase in a precipitation reaction time facilitates the entire reaction, which has an effect on the crystallinity of finally obtained cerium carbonate powder. Therefore, the reaction time during the precipitation reaction preferably ranges from 30 minutes to 60 hours.

Preferably, the cerium carbonate powder prepared in this way is subjected to centrifugal separation and washing, and then is dried at about 90° C. for 24 hours.

Meanwhile, since the cerium carbonate powder of the present invention is prepared through the inventive method characterized by using an organic solvent, the organic solvent may remain on the surface or inside of the cerium carbonate powder, even after the centrifugal separation, washing and drying steps. The residual organic solvent may be analyzed by measuring carbon residue with TOC (Total Organic Carbon), or the like. Also, in a certain analysis method in which carbon residue may be detected together with carbonate ($-CO_3$) forming cerium carbonate, it is preferable that, except the carbonate ($-CO_3$), only carbon residue is analyzed. For example, the cerium carbonate powder of the present invention may contain carbon (except the carbonate ($-CO_3$)) remaining in an amount of 0.1 ppm to 100 ppm. Carbon residue analyzed in an amount of less than the above range may be caused by analytical errors, or may be detected in the case of using water alone as a solvent.

Cerium oxide powder according to the present invention may be prepared from cerium carbonate powder by a powder preparation method using a firing-step generally known in the art. Such a powder preparation method may preferably include a firing step, in which cerium carbonate powder according to the present invention is heat-treated at 300° C. to 1500° C.

When cerium oxide is used as an abrasive for CMP slurry, the crystal structure of cerium carbonate (that is, an intermediate product for cerium oxide) has a significant influence on a size and a shape of cerium oxide powder, as well as a polishing property of the cerium oxide powder as an abrasive.

CMP slurry including the cerium oxide powder as an abrasive may be prepared by dispersing the cerium oxide powder and a dispersant into a solvent.

The dispersant applicable in the present invention includes a non-ionic polymer dispersant or an anionic polymer dispersant. The non-ionic polymer dispersant includes at least one kind selected from the group including polyvinyl alcohol (PVA), ethylene glycol (EG), glycerin, polyethylene glycol (PEG), polypropylene glycol (PPG), and polyvinyl pyrrolidone (PVP). The anionic polymer dispersant includes at least one kind selected from the group including polyacrylic acid, ammonium polyacrylate, and polyacryl maleic acid. However, the above examples of dispersant are illustrative only, and the scope of the present invention is not limited thereto.

The dispersant is preferably contained in an amount of 0.001 to 10 parts by weight, based on 100 parts by weight of cerium oxide as an abrasive. More preferably, the dispersant is contained in an amount of 0.02 to 3.0 parts by weight, based on 100 parts by weight of cerium oxide. If the content of the dispersant is less than 0.001 parts by weight, rapid precipitation is caused by low dispersibility, so that the abrasive cannot be uniformly supplied because precipitation occurs in the middle of the transport of the polishing slurry. Contrarily, if the dispersant is contained in an amount greater than 10 parts by weight, a thick dispersant polymer layer functioning like a cushioning layer may be formed in the vicinity of the abrasive particles, which makes it difficult to allow the surface of the abrasive particles to come in contact with a silica surface for polishing, resulting in a drop in polishing rate.

Preferably, the CMP slurry is obtained by mixing cerium oxide powder with a dispersant in water and then titrating the resultant solution to pH 6 to 8. For the pH titration, 1N KOH, 1N $HNO_3$, etc. may be used.

Upon the completion of the pH titration, the CMP slurry is preferably subjected to a dispersion stabilization step in order to improve its dispersion and storage stability. The dispersion stabilization step may be performed using a dispersion system generally known in the art. For example, an APEX mill (Kotobuki eng. & mfg. Co., Japan) may be used. When the dispersion stabilization step is performed using the APEX mill, zirconia beads with a size of 0.01 to 1 mm are used, cerium oxide slurry is introduced into the APEX mill at a feed rate of 10 to 1000 ml/min by using a pump, and a mixture of the zirconia beads and the cerium oxide slurry is repeatedly agitated in the mill at a rate of 2000 to 5000 rpm over 1 to 20 passes.

BRIEF DESCRIPTION OF THE DRAWINGS

FIG. 1 is a graph illustrating results of XRD (X-Ray Diffraction) analysis of cerium carbonate powders prepared in Examples 1-3 and Comparative Examples 1-3.

BEST MODE FOR CARRYING OUT THE INVENTION

Reference will now be made in detail to the preferred embodiments of the present invention. It is to be understood that the following examples are illustrative only, and the scope of the present invention is not limited thereto.

EXAMPLE 1

A first solution was prepared in a vessel by dissolving 0.1 mol of cerium nitrate in 50 mL of distilled water at room temperature, and mixing 50 ml of ethylene glycol (boiling point: 196° C.) with the dissolved cerium nitrate. Also, a second solution was prepared in another vessel by dissolving 0.1 mol of urea in 50 mL of distilled water at room temperature and mixing 50 ml of ethylene glycol (boiling point: 196° C.) with the dissolved urea. Then, the two solutions were mixed and were subject to precipitation reactions at a temperature of 150° C. for 24 hours. XRD analysis confirmed that the resultant powder is cerium carbonate powder with a hexagonal structure as shown in FIG. 1.

EXAMPLE 2

Cerium carbonate powder was obtained in the same manner as described in Example 1, except that cerium nitrate was dissolved in 100 ml of ethylene glycol (boiling point: 196° C.), and urea was dissolved in 100 mL of distilled water. XRD analysis confirmed that the resultant powder is cerium carbonate powder with a hexagonal structure as shown in FIG. 1.

EXAMPLE 3

Cerium carbonate powder was obtained in the same manner as described in Example 1, except that a mixture of 60 ml of distilled water and 40 ml of 1,3-propanediol (boiling point: 214° C.) was used as a solvent for cerium nitrate and urea, instead of a mixture of 50 ml of distilled water and 50 ml of ethylene glycol (boiling point: 196° C.). XRD analysis confirmed that the resultant powder is cerium carbonate powder with a hexagonal structure as shown in FIG. 1.

COMPARATIVE EXAMPLE 1

Cerium carbonate powder was obtained in the same manner as described in Example 1, except the precipitation reaction temperature was 90° C., instead of 150° C. XRD analysis confirmed that the resultant powder is cerium carbonate powder with an orthorhombic structure as shown in FIG. 1.

COMPARATIVE EXAMPLE 2

Cerium carbonate powder was obtained in the same manner as described in Example 1, except the precipitation reaction temperature was 105° C., instead of 90° C. XRD analysis confirmed that the resultant powder is cerium carbonate powder with an orthorhombic structure as shown in FIG. 1.

COMPARATIVE EXAMPLE 3

Cerium carbonate powder was obtained in the same manner as described in Example 1, except that an organic solvent was not used, and only distilled water was used as a solvent. XRD analysis confirmed that the resultant powder is cerium carbonate powder with an orthorhombic structure as shown in FIG. 1.

Also, when an organic solvent having a boiling point of less than 60° C. was used, urea was not decomposed, and thereby cerium carbonate powder was not formed. Also, when an organic solvent having a boiling point of more than 300° C. was used, a reactant cannot obtained due to melting in a reactor in the middle of the reaction.

INDUSTRIAL APPLICABILITY

As can be seen from the foregoing, in preparing cerium carbonate under atmospheric pressure by a precipitation reaction, the present invention makes it possible to easily prepare cerium carbonate powder with a hexagonal crystal structure by using urea as a precipitant, using at least one type of organic solvent as a solvent, and varying temperature of the precipitation reaction. Especially, the use of urea as a precipitant can improve the uniformity of a reaction, and thus it is possible to easily and inexpensively obtain cerium carbonate powder with a hexagonal crystal structure without the danger by high-temperature high-pressure and the need for an expensive system in hydrothermal synthesis. Accordingly, the physical properties of cerium oxide prepared from the cerium carbonate can be easily controlled, thereby improving the performance of an abrasive for CMP slurry.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method for preparing cerium carbonate powder comprising:
   (a) mixing a cerium precursor solution with a urea solution; and
   (b) carrying out a precipitation reaction at a temperature in a range of 120° C. to 300° C.,
   wherein the cerium carbonate powder has a hexagonal crystal structure, and
   wherein at least one of the cerium precursor solution and the urea solution comprises at least one organic solvent selected from the group consisting of an alcohol based solvent, a glycol based solvent, dimethyl sulfoxide and dimethyl formamide.

2. The method according to claim 1, wherein a cerium precursor of the cerium precursor solution comprises cerium nitrate or cerium acetate.

3. The method according to claim 1, wherein the cerium precursor solution comprises a cerium precursor and a solvent in a weight ratio of 1:100 to 1:1, and the urea solution comprises urea and a solvent in a weight ratio of 1:100 to 1:1.

4. The method according to claim 1, wherein, in the precipitation reaction, a mixing molar ratio of a cerium precursor to urea is in a range of 1: 0.1 to 1:20.

5. The method according to claim 1, wherein the precipitation reaction is performed for 30 minutes to 60 hours.

6. The method according to claim 1, wherein the precipitation reaction is performed under atmospheric pressure.

* * * * *